March 15, 1955  J. H. ORR  2,704,226
MOTOR CAR BODY WITH COLLAPSIBLE HOOD
Filed Aug. 29, 1952  2 Sheets-Sheet 1
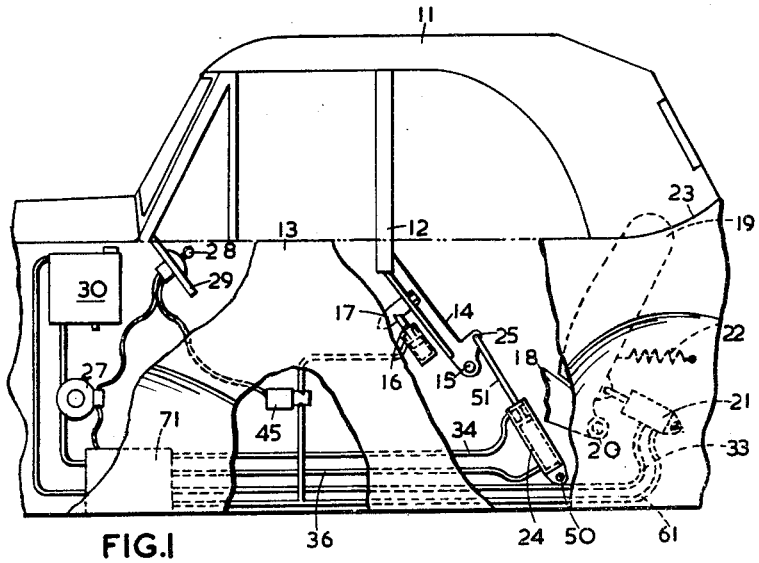
FIG.1
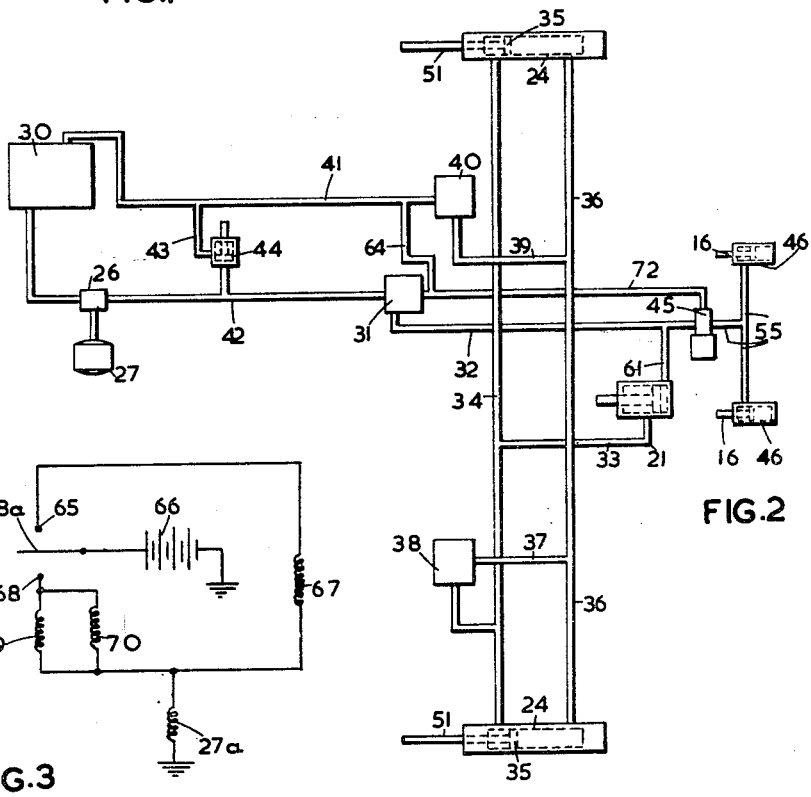
FIG.2
FIG.3
INVENTOR
J. H. ORR
BY
Mawhinney & Mawhinney
ATTYS.

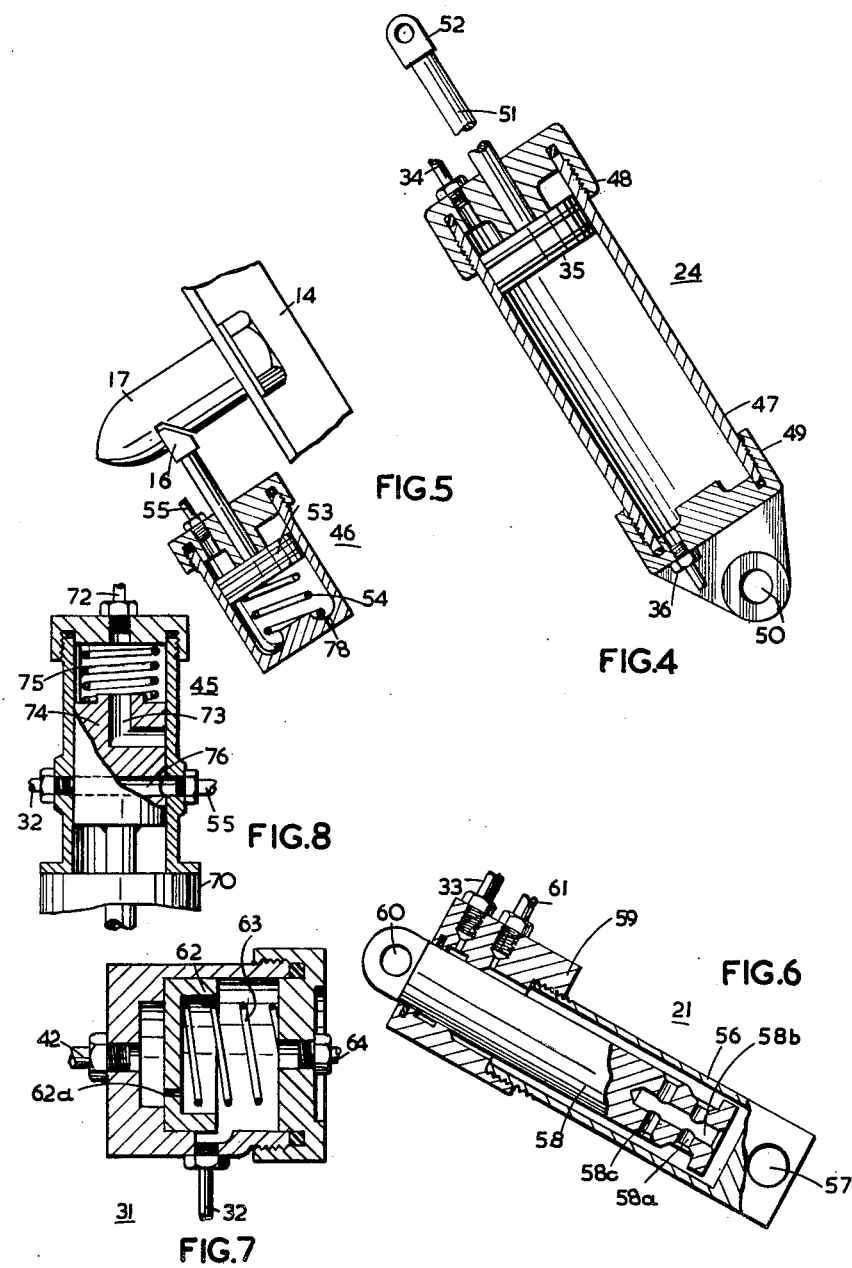

United States Patent Office 2,704,226
Patented Mar. 15, 1955

2,704,226

MOTOR CAR BODY WITH COLLAPSIBLE HOOD

John H. Orr, Coventry, England, assignor to Carbodies Limited, Coventry, England Application August 29, 1952, Serial No. 307,047

Claims priority, application Great Britain September 15, 1951

3 Claims. (Cl. 296—117)

This invention relates to a motor car body of the kind having a collapsible head which is movable, by a power-operated means which is set in operation by the actuation of a manual control, between an erected position and a stowed position within a compartment of the body, the compartment having a front wall which is provided by the back of an adjacent seat.

With motor car bodies of this kind the mouth of the compartment must be made sufficiently wide, in the fore-and-aft direction of the body, for providing clearance for the head when moving from one of its positions to the other, but by providing the compartment with a wide mouth either the passenger or a rear luggage space is encroached upon. An object of the invention is an improved construction whereby the mouth of the compartment can be made wide enough to provide the clearance for the passage of the head, and yet not to encroach upon the passenger or luggage space when the head is erected or stowed. A further object is to enable this to be done without complicating the actions to be carried out by the operator.

According to the invention the seat-back is hinged, remotely from its top, to the body on an axis which is transverse to the body, and is tiltable forwardly on its hinge, for adequately widening the mouth of the compartment (for the passage of the head) before the movement of the head in either direction commences, by a second power-operated means which is set in operation by the same actuation of the manual control which sets in operation the first-mentioned power-operated means.

The power-operated means for moving the head can be a hydraulic piston and cylinder arrangement, and the manual control can be an electric switch in the circuit of an electric motor connected to drive a pump for supplying hydraulic fluid under pressure to the said piston and cylinder arrangement. In this case the seat-back can be biassed to a normal rearward position and the means for tilting it forwardly can be a second hydraulic piston and cylinder arrangement which is interposed in the path of the hydraulic fluid to the first-mentioned piston and cylinder arrangement, the second arrangement acting as a valve to permit the operation of the first-mentioned arrangement (i. e., for moving the head) only when the seat-back is tilted forward.

It is known to provide a motor car body of the kind set forth with a slam-type catch to engage a frame member of the head to lock the latter in its erected position, the coacting elements of the catch being respectively fast with a stationary part of the body and the said frame member. In such a case, according to the invention, there can be a third hydraulic piston and cylinder arrangement which is connected to be operated, for releasing the catch, before the said second arrangement permits the first-mentioned arrangement to move the head to the stowed position. Thus when lowering the head from the erected position, a single electric switch can be operated for causing the pump to deliver hydraulic fluid under pressure firstly to the said second and third piston and cylinder arrangements, for tilting the seat-back forwardly and for releasing the slam-type catch, and then to the first said piston and cylinder arrangement for lowering the head. At the end of the lowering movement the switch can be moved to a neutral position to enable the slam-type catches to be ready to operate (i. e., when the head is next raised) and the seat-back to return to its normal position under its biassing means. When the head is to be raised the seat-back is tilted forwardly before the head commences to be raised by the operation of the first said piston and cylinder arrangement.

In the drawings:

Figure 1 is a side-elevation, with parts broken away, of a portion of a motor car body in accordance with the invention;

Figure 2 is a diagram showing the arrangement of the various components in the hydraulic circuit;

Figure 3 is a diagram of the electric circuit for controlling the hydraulic operation;

Figure 4 is a longitudinal section, to a larger scale, of a double-acting hydraulic ram for raising and lowering the head;

Figure 5 is an enlarged longitudinal section through a hydraulically-releasable catch arrangement for holding the head in erected position, a coacting portion of the catch fast with the head being shown in elevation;

Figure 6 is an enlarged longitudinal section, through a hydraulic jack for tilting the back of the rear seat;

Figure 7 is a longitudinal section through a main valve of the hydraulic circuit; and Figure 8 is a longitudinal section through a control valve for the releasable catch, the valve being shown in the position for withdrawing the catch.

Referring firstly to Figure 1 the collapsible head 11 includes a forward, inverted U-shaped frame member 12 of which the arms extend to opposite sides of the motor-car body 13 and are fast with arms 14 by which they are pivoted at 15 from the body. The member 12 is held in erected position by hydraulically-releasable catches 16 engaging notches of catch members 17 respectively fast with the arms 14.

The rear seat is shown at 18, and its back 19 is pivoted at 20 from the body for forward tilting by a hydraulic jack 21 against a spring 22 which biasses the seat-back 19 into a normal position. Behind the seat-back and within the head 11 is the rear portion 23 of the mouth of a stowage compartment which extends forwardly along the sides of the body. When the head is to be lowered into, or raised from the stowage compartment, the jack 21 is operated to tilt the seat-back 19 forwardly for temporarily widening the mouth 23 whereby to facilitate the movement of the head therethrough by a double-acting ram 24 acting on a lateral extension 25 of the arm 14.

The hydraulic supply is from a pump 26 which is driven from an electric motor 27 controlled by a switch 28 on the facia board 29 of the body, the switch being operable, against a bias, into two alternative operative positions from a central neutral one. The pump is fed from a supply tank 30, and the operation of the hydraulic circuit and its components will best be understood from a consideration of Figure 2.

In the latter is indicated a main valve 31 through which, when the switch 28 is operated, hydraulic fluid from the pump is delivered to a pipe 32. The latter supplies the jack 21 for tilting the seat-back 19 forwardly, and when that has been done the jack 21, as hereinafter described, allows the hydraulic fluid to pass to pipes 33 and 34 for supplying the two rams 24. Thus the rams 24 cannot operate before the mouth portion 23 is sufficiently widened. The rams 24, at the opposite sides of their pistons 35, are interconnected by a pipe 36, and the pipes 34 and 36 are interconnected by a pipe 37 containing a solenoid-operated cut-off valve 38. The return path of the hydraulic circuit is from the pipe 36 and through a pipe 39, containing a second solenoid-operated cut-off valve 40, and pipe 41 leading to the tank 30. Between the pipe 41 and a pipe 42, through which latter the pump supplies the main valve 31, extends a by-pass passage 43 containing a pressure relief valve 44.

As it is necessary to release the latches 16 before lowering the head and to allow them resiliently to engage the notches of the catch members 17 when the head is erected, a blocking valve 45, which is biassed to closed position and opened by a solenoid 70, cuts off the supply of hydraulic fluid to hydraulic devices 46, which are for retracting the catches 16, when the head is being erected. In order to prevent the cathces becoming hydraulically locked by the valve 45, the valve is formed, as shown in Figure 8, as a two-way valve, the valve when closed connecting a pipe 55 to a return line 72 via the passage 73 in the valve member 74, and, when opened by its solenoid against the bias of a spring 75, connecting, through the passage 76, the pipe 32 to the pipe 55 for supplying the devices 46.

Referring to Figure 4, each of the rams 24 includes a cylinder 47 screw-threaded into end covers 48, 49 of which the latter has a bearing 50 for pivoting to the car body. The rod 51 of the piston 35 extends through the cover 48 for pivotal connection at 52 to the extension 25 of the appropriate arm 14, and owing to the rod 51 the effective areas of the opposite sides of the piston are different.

Each of the hydraulic devices 46 (see Figure 5) includes a piston 53 which carries the catch member 16 and is biassed by a spring 54 in the engaging direction. The hydraulic supply is through the pipe 55 and depresses the piston for releasing the member 17, a vent hole 78 being provided for preventing a build-up of pressure behind the piston 53.

As shown by Figure 6 the hydraulic jack 21 includes a barrel 56 which is closed at one end where it has a bearing 57 by which it can be pivoted from the car body, and the piston 58 is in the form of a rod extending through a body 59 at the other end of the barrel, the rod having a bearing 60 for pivotal connection to the rear of the seat-back 19. The supply of hydraulic fluid to the barrel is through a pipe 61, and it will be seen that it is not until the piston will have travelled for tilting the seat-back (i. e., to the left of the figure) that it uncovers an outlet to the pipe 33 for supplying the rams 34, the hydraulic fluid then passing through the port 58a, the bore 58b and the port 58c to the pipe 33.

The main valve (see Figure 7) has a piston valve member 62 which, when the pump is started up, is moved against a spring 63 to uncover a port leading to the pipe 32 and to seal a port communicating with a pipe 64 presently to be described.

For raising the head from the stowed position the switch member 28a (see Figure 3) is moved to engage a contact 65 and this energizes, from the normal service battery 66 of the motor car, the solenoid 67 of the valve 38 for opening it, and also the winding 27a of the electric motor 27 for actuating the pump. In these conditions the pump actuates the valve 31 to place the pipes 42 and 32 in communication and thus supply hydraulic fluid to the jack 21 to tilt the seat-back forwardly, and, after the piston of the jack opens the pipe 33 to the supply, the fluid is delivered to both sides of the pistons 35 (i e., through pipe 34 to the piston rod sides and through the valve 38 and pipes 37 and 36, to the other sides). Due to the unequal areas at opposite sides of the pistons, they are moved to extend the rods 51 for raising the head, the volume of fluid supplied being equal to the increase in volume of the jack cylinders due to the travel of the pistons. Due to the valve 45 not being operated there is no hydraulic supply to the devices 46 and the catches 16 are free to engage the notches in the members 17 when the head is fully erected. The switch member 28a should then be allowed to return to its neutral position, and this stops the pump, causing the spring to return the piston 62 of the main valve to the position shown in Figure 7, a bleed hole 62a being provided through the piston 62 to relieve the hydraulic lock then existing on the piston and so allowing it to return, thus placing the pipes 32 and 64 in communication. The return of the switch member also causes the cut-off valve 38 to close, thus hydraulically locking the pistons 35.

The seat-back 19 is then returned by the spring 22 to its normal position and this moves the piston 58 inwardly to expel the fluid, between it and the barrel 56, reversely through the pipes 61 and 32 to the main valve 31, whence it returns through the pipes 64 and 41 to the tank.

For lowering the head the switch member 28a is moved into engagement with the contact 68 and this energises the solenoid windings 69, 70, respectively of the valves 40 and 45 to open them, and also energises the winding 27a of the pump motor. In these conditions the pipes 55 are open to the supply for withdrawing the catches 16 at the same time as the jack 21 is supplied for tilting the seat-back forwardly. The valve 38 is closed, and the supply from the pipe 33 is to the smaller-area sides of the pistons 35, which latter move inwardly of their cylinders to lower the head. The fluid at the larger area sides of the pistons 35 is returned through the pipes 36 and 39, the open valve 40 and the line 41 to the tank 30.

Should the switch member 28a be held against either of the contacts 65 or 68 after the operation of the rams 24 in either direction has been completed, the relief valve 44 will open to by-pass the pump output directly to the tank 30.

The valves 31, 38, 40 and 44 can be arranged in a casing such as shown at 71 in Figure 1.

What I claim as my invention and desire to secure by Letters Patent of the United States is:

1. An automobile having a retractable head, including a body and a seat-back therein forming a compartment into which the head can be retracted, said head pivoted from said body at a position forwardly of said compartment for downward and rearward swinging thereinto for stowage purposes, said seat-back being hinged below its upper edge for forward tilting to widen the mouth of said compartment, servo means for actuating the head in either direction, a second servo means for effecting the tilting of said seat-back, and means rendered operative by said second servo means when the latter has tilted said seat-back fully forwards for energizing said first servo means to move said head, and in which each of said servo means is a hydraulic means, including a pump for supplying hydraulic fluid under pressure to both said hydraulic means, an electric motor for driving said pump, and a main control in the form of a switch for the circuit of said motor, the hydraulic means for tilting said seat-back being interposed in the path by which the hydraulic fluid is supplied to the hydraulic means for actuating the head and the hydraulic means for tilting the seat-back including a piston which, when the seat-back has been fully tilted forwardly, establishes a path through which the hydraulic fluid is supplied to the hydraulic means for actuating the head.

2. An automobile having a retractable head according to claim 1, and provided with a slam-type catch to lock the head in its erected position, said catch being released by a third hydraulic means which is arranged to be energized, on the actuation of the main control, before the hydraulic means for actuating the head is energized.

3. An automobile having a retractable head according to claim 1, and in which the hydraulic means for actuating the head includes a piston rod extending from one end thereof, whereby opposite sides of the piston have different effective areas, means for connecting the smaller area side of the piston to the hydraulic supply, and for connecting the larger area side to the return hydraulic path, for retracting the head, and means for connecting both sides of the piston to the hydraulic supply for raising the head by means of the pressure difference acting on the piston.

References Cited in the file of this patent

UNITED STATES PATENTS

| | | |
|---|---|---|
| 1,426,129 | Velo | Aug. 15, 1922 |
| 1,990,848 | Velo | Feb. 12, 1935 |
| 2,105,293 | Paulin | Jan. 11, 1938 |
| 2,128,849 | Redfern | Aug. 30, 1938 |
| 2,529,458 | Orr | Nov. 7, 1950 |
| 2,599,277 | Orr | June 3, 1952 |
| 2,622,400 | Greer | Dec. 23, 1952 |

FOREIGN PATENTS

| | | |
|---|---|---|
| 464,270 | Great Britain | Apr. 14, 1937 |